United States Patent
Eick et al.

(10) Patent No.: US 10,488,546 B2
(45) Date of Patent: Nov. 26, 2019

(54) AUTONOMOUS ELECTRICAL METHODS NODE

(75) Inventors: Peter M. Eick, Houston, TX (US); Joel D. Brewer, Houston, TX (US); Frank D. Janiszewski, Richmond, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 449 days.

(21) Appl. No.: 13/312,058

(22) Filed: Dec. 6, 2011

(65) Prior Publication Data

US 2012/0146648 A1    Jun. 14, 2012

Related U.S. Application Data

(60) Provisional application No. 61/422,759, filed on Dec. 14, 2010.

(51) Int. Cl.
*G01V 3/36* (2006.01)
*G01V 3/38* (2006.01)

(52) U.S. Cl.
CPC ..................... *G01V 3/38* (2013.01)

(58) Field of Classification Search
CPC . G01V 3/26; G01V 3/265; G01V 3/30; G01V 1/22; E21B 47/02; E21B 47/022; E21B 47/02208; E21B 47/024; E21B 47/026; E21B 47/08; E21B 47/082
USPC ............ 324/338, 346, 357; 166/250.1, 308.1
See application file for complete search history.

(56) References Cited

U.S. PATENT DOCUMENTS

| | | | |
|---|---|---|---|
| 4,446,433 A | 5/1984 | Shuck | |
| 5,724,241 A | 3/1998 | Wood et al. | |
| 6,116,342 A | 9/2000 | Clark et al. | |
| 6,330,914 B1 | 12/2001 | Hocking et al. | |
| 6,711,529 B1* | 3/2004 | Thore | ............... 703/2 |
| 7,073,581 B2* | 7/2006 | Nguyen et al. | ........ 166/250.12 |
| 7,082,993 B2 | 8/2006 | Ayoub et al. | |
| 7,210,526 B2 | 5/2007 | Knobloch | |
| 7,269,095 B2* | 9/2007 | Chamberlain et al. | ........ 367/76 |
| 7,340,348 B2 | 3/2008 | Strack et al. | |
| 7,424,911 B2 | 9/2008 | McCarthy et al. | |
| 7,450,053 B2 | 11/2008 | Funk et al. | |
| 7,451,812 B2 | 11/2008 | Cooper et al. | |
| 7,598,898 B1* | 10/2009 | Funk | .................. G01S 7/003 |
| | | | 342/175 |
| 7,712,527 B2 | 5/2010 | Roddy | |
| 7,726,397 B2 | 6/2010 | McDaniel et al. | |
| 7,754,659 B2 | 7/2010 | Rediger et al. | |

(Continued)

FOREIGN PATENT DOCUMENTS

| | | |
|---|---|---|
| WO | 2007013883 A2 | 2/2007 |
| WO | WO2009151891 | 12/2009 |

(Continued)

OTHER PUBLICATIONS

Brian Anderson, et al., Autonomous Nodes for Time Lapse Reservoir Seismic: An Alternative to Permanent Seabed Arrays, PESA News, Jun./Jul. 2009, pp. 52-54.

(Continued)

*Primary Examiner* — Huy Q Phan
*Assistant Examiner* — Adam S Clarke
(74) *Attorney, Agent, or Firm* — Conocophillips Company

(57) ABSTRACT

The present invention relates to a method and apparatus for evaluating and measuring the geometry of a fracture.

16 Claims, 1 Drawing Sheet

(56) References Cited

U.S. PATENT DOCUMENTS

| | | |
|---|---|---|
| 2003/0038634 A1 | 2/2003 | Strack |
| 2004/0079526 A1* | 4/2004 | Cairns .................. E21B 44/00 166/255.2 |
| 2004/0206495 A1* | 10/2004 | Lehman ................ E21B 43/26 166/250.1 |
| 2005/0017723 A1 | 1/2005 | Entov et al. |
| 2005/0020275 A1* | 1/2005 | Agrawala ................ G01S 5/02 455/456.1 |
| 2005/0184260 A1 | 8/2005 | Fageraas et al. |
| 2006/0102345 A1* | 5/2006 | McCarthy .............. C09K 8/805 166/250.1 |
| 2006/0235666 A1* | 10/2006 | Assa ..................... G01V 11/00 703/10 |
| 2007/0235181 A1* | 10/2007 | Lecampion ............ E21B 43/26 166/177.5 |
| 2007/0256830 A1 | 11/2007 | Entov et al. |
| 2008/0042653 A1* | 2/2008 | Bryant ......................... 324/348 |
| 2008/0144442 A1* | 6/2008 | Combee et al. ............. 367/131 |
| 2008/0149329 A1 | 6/2008 | Cooper et al. |
| 2009/0080290 A1* | 3/2009 | Ray et al. ...................... 367/51 |
| 2009/0166030 A1 | 7/2009 | Zhuravlev et al. |
| 2009/0179649 A1 | 7/2009 | Schmidt |
| 2009/0250216 A1 | 10/2009 | Bicerano |
| 2009/0256575 A1 | 10/2009 | Pisklak et al. |
| 2009/0288820 A1 | 11/2009 | Barron et al. |
| 2010/0017139 A1* | 1/2010 | Adams et al. .................. 702/14 |
| 2010/0038083 A1 | 2/2010 | Bicerano |
| 2010/0147512 A1 | 6/2010 | Cramer et al. |
| 2010/0157737 A1* | 6/2010 | Miller ................... E21B 33/124 367/117 |
| 2010/0307742 A1* | 12/2010 | Phillips ................ E21B 47/022 166/250.01 |
| 2012/0027030 A1* | 2/2012 | Naito et al. ................... 370/503 |
| 2012/0130644 A1 | 5/2012 | Eick et al. |
| 2013/0333879 A1* | 12/2013 | Rasheed ................ E21B 10/32 166/250.1 |

FOREIGN PATENT DOCUMENTS

| | | |
|---|---|---|
| WO | WO2010019424 | 2/2010 |
| WO | 2010057677 A1 | 5/2010 |

OTHER PUBLICATIONS

Labrecque, et al—Autonomous Monitoring of Fluid Movement Using 3-D Electrical Resistivity Tomography, 2004 Journal of Environmental and Engineering Geophysics, vol. 9, Issue No. 3, 10 pgs.

International Search Report for PCT/US2011/063545 dated Mar. 2, 2012, 1 pg.

* cited by examiner

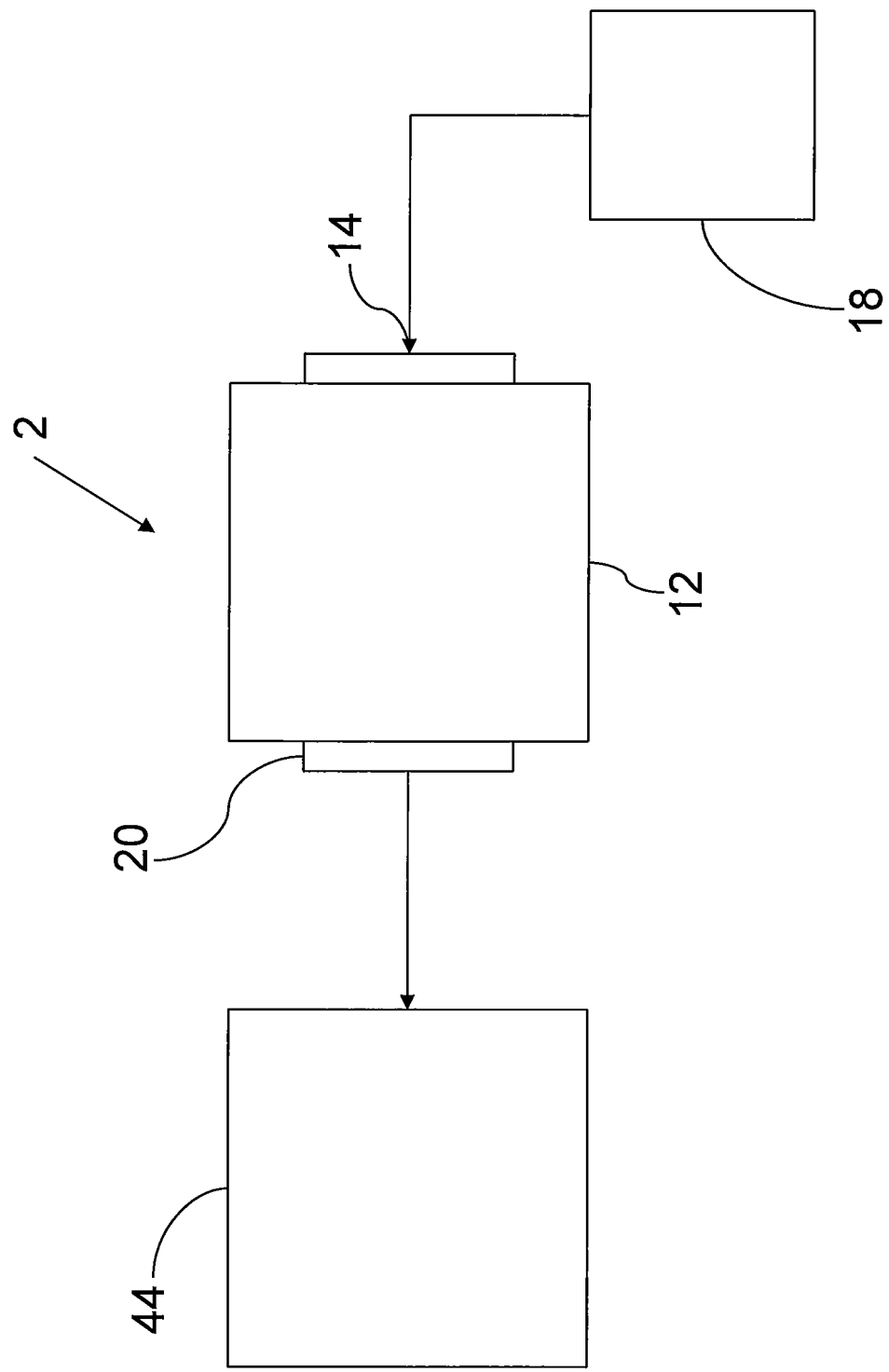

AUTONOMOUS ELECTRICAL METHODS NODE

CROSS-REFERENCE TO RELATED APPLICATIONS

This application claims priority benefit under 35 U.S.C. Section 119(e) to U.S. Provisional Patent Ser. No. 61/422,759 filed on Dec. 14, 2010 the entire disclosure of which is incorporated herein by reference.

FIELD OF THE INVENTION

The present invention relates to a method and apparatus for evaluating and measuring the geometry of a fracture. More particularly, the present invention relates to a method and apparatus for evaluating and measuring the geometry of a fracture utilizing an autonomous node measuring electrical properties.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often hydraulically fractured to stimulate production of hydrocarbons from the wellbore. Hydraulic fractures are created in subterranean formations by hydraulically injecting water or high viscosity fluid (also referred to as fracturing fluid) containing a proppant at a high flow rate into a wellbore and forcing the fracturing fluid against the formation strata by pressure. The formation strata or rock is forced to crack, creating or enlarging one or more fractures. The proppant subsequently prevents the fracture from closing completely and thus provides improved flow of recoverable fluid, i.e., oil, gas or water.

Because aging wells are often produced from multiple intervals, some very thin, the ability to locate these stimulation treatments with pinpoint accuracy is a key to more effective remediation and increased ultimate recovery. Also in more "non-conventional" plays like the fractured shales, the quality and extent of the fracture job is paramount to the financial success of the well and the play. However, few methods exist for accurately visualizing fracture length, proppant penetration, and estimated flow in the new fracture to accurately assess production capabilities and the need for further remediation before production is initiated.

Some technologies have tried to determine the extent and position of a fracturing using various imaging techniques. For example, Hocking et al., U.S. Pat. No. 6,330,914 provides a method for monitoring a propagating vertical fracture in a formation by injecting conductive fracture fluid into the formation to initiate and propagate the fracture; energizing the fracture fluid via an electrical voltage while the fracture propagates; and measuring the inducted electromagnetic field parameters to judge about the fracture development and geometry. Further, McCarthy, et al., WO2007013883, provides introducing a target proppant; transmitting electromagnetic radiation from about 300 megahertz-100 gigahertz; and analyzing a reflected signal from the target particle to determine fracture geometry. Lastly, Nguyen et al., U.S. Pat. No. 7,073,581, describes electro-conductive proppant compositions and related methods of obtaining data from a portion of a subterranean formation.

Each of these techniques, however, seem to rely on detecting data utilizing a series of sensors connected to recording equipment, that multiplexes the data and records the measured voltage via a wire based system or collects data by sensors located at the well bore or adjacent well bores. Having numerous sensors and bulky wiring systems laying on the ground around an active drill rig and production site is a recipe for system failures, lost data due to failures in timing and communication, and broken or crushed wires. These and other techniques for detecting fracture geometry fail to account for how to actually measure the data in the field, which is a critical step in the practical success of evaluating and measuring the geometry of a fracture.

Knowing, measuring and translating data from various sensors and tools is of primary importance to the geophysicists and the drilling and completion engineer in order to determine if fracturing was successful and as a predictor of expected production rates from the well. Furthermore, the ability to determine the fracture geometry in 3D and 4D provides enhanced recovery data. It is therefore an object of the present invention provide a method and apparatus for evaluating and measuring the geometry of a fracture.

SUMMARY OF THE INVENTION

In an embodiment, an apparatus for evaluating and measuring the geometry of a fracture includes: (a) at least one geophysical receiver package connected to a seismic interface box; (b) a seismic interface box connected to an autonomous seismic data node, wherein the seismic interface box converts an electrical signal received from the at least one geophysical receiver package into a voltage signal compatible with the autonomous seismic data node; and (c) an autonomous seismic data node.

In another embodiment, a method for evaluating and measuring the geometry of a fracture includes: (a) injecting a proppant into the fracture; (b) charging the proppant with an electrical signal; (c) transmitting an electrical signal into the fracture; (d) detecting the electrical signal with at least one geophysical receiver package; (e) converting the electrical signal from the geophysical receiver package into a voltage signal compatible with an autonomous data recorder; (f) using the autonomous recorder to recorder the voltage signal; and (g) evaluating and measuring the geometry of the fracture using the recorded data from step (f).

BRIEF DESCRIPTION OF THE DRAWINGS

The invention, together with further advantages thereof, may best be understood by reference to the following description taken in conjunction with the accompanying drawings in which:

FIG. 1 is a schematic diagram illustrating an embodiment for evaluating the geometry of a fracture.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

The present invention provides an apparatus and method for evaluating and measuring the geometry of a fracture. In a field, each apparatus utilized operates independently of one another. Referring to FIG. 1, the apparatus, referred to as a "receiver," includes at least one receiver package 18 connected to a seismic interface box 12 connected to an autonomous seismic data node 44. The receivers are arranged in a 3D grid configuration on the surface over the area around the wellbore, although alternative layout configurations may be used. The grid can be adjusted to suit the resolution and imaging or geophysical requirements of the individual well or project requirements. The grid of receivers is time stamped and synchronized to global positioning time (GPS), so a baseline survey can be measured.

The receiver package or sensor package can measure, for example, self potential, induced potential, resistivity, electromagnetic and magnetic geophysical properties used for geophysical surveys. The sensors in the receiver package can include geophones, hydrophones, accelerometers, electrodynamic receivers, resistivity probes, conductivity electrical probes and any combination thereof. The receiver package may receive one or more types of data including vibrational data, magnetic data, acceleration data, electrical data, conductivity data, and resistivity data along with the more common location, temperature, time, date, and the like. Vibrational data may be measured between about 0.1 Hz to 2 KHz, including data from 6 to 80 Hz, about 20 to 40 Hz, or simply all data less than 160 Hz, and any combination thereof. The sensor package is connected to and delivers data to the seismic interface box.

It may be necessary to convert the data provided by the receiver package into voltage based signals compatible with conventional 24 bit seismic survey equipment, such as a conventional seismic recorder. In an embodiment, a seismic interface box is utilized which understands the low voltages from field equipment and converts the data into a voltage signal that can then be digitized by the seismic data equipment and stored. For example, Eick et al., U.S. patent application Ser. No. 13/297,456, demonstrates a method and apparatus for evaluating the geometry of a fracture, specifically relates to an electric methods seismic interface box and a method of using the apparatus to record electrical methods geophysical data. The seismic interface box is connected to and delivers converted data to the autonomous seismic data node.

The autonomous seismic data node is comprised of at least a data recorder module, timing module, digital to digital or analog to digital converter module, data storage apparatus, power source or connection and controlling computer module. Additional features can include data transmission interface or radio connection, radio control connection, GPS or radio timing module, etc. The autonomous seismic data node may also include a transmitter to transmit the data to a remote facility or to an operator location if so desired. The autonomous seismic data node may receive instructions or radio transmissions that could allow remote control of the unit or system checks. There are numerous types of autonomous seismic recorders, some of which have the ability to provide telemetry or data communication and command and control of the autonomous recorder, referred to as a semi-autonomous recorder. Autonomous or semi-autonomous recorders may be utilized in the present invention.

Referring again to FIG. 1, the seismic interface box 2 includes a lightweight sealed housing 12 designed to withstand expected environmental conditions. At least one input connector 14 and at least one output connector 20 form part of the housing. The input connector 14 receives data from at least one receiver 18 via one or more strings. The incoming data is received as an electrical signal, which is not compatible with a conventional seismic recorder. The seismic interface box converts the electrical signal into a voltage signal compatible with the autonomous seismic recorder 44. In an embodiment, the seismic interface box is merged into the receiver package to form a more compact package for deployment and use in the field. In another embodiment, the seismic interface box is merged into the autonomous seismic data node to form a more compact package for deployment and use in the field.

The data output connector is coupled to the autonomous seismic data node 44 for delivering the converted voltage signal from the autonomous seismic recorder to the main seismic recorder or data transcriber. The autonomous seismic recorder or data transcriber unit collects and transfers the data to a removable/portable media device for later use and storage. The autonomous seismic data node is a data collection unit that works independently of other units and is not required to be controlled by radio telemetry or similar techniques during the course of the seismic survey. The autonomous seismic data node includes a receiver, a field timer, a standard timer, a transmitter and a battery. In an embodiment, data is stored on a temporary drive at the autonomous seismic data node until it is transferred either physically or wirelessly for data analysis.

To evaluate and measure the geometry of a fracture, for example in the case of an electrical methods measurement, an electrical signal is transmitted into the fracture, the electrical signal is detected by at least one receiver package, the electrical signal is converted into a voltage signal compatible with an autonomous seismic data node, the voltage signal is recorded via the autonomous seismic data node and the geometry of the fracture is evaluated and measured through the use of inversion or modeling techniques. The methods used can determine the geometry of the fracture both spatially and time-resolved; thus, real-time measurements of the fracture growth can be possible. More generally, the electrical signal can comprise, for example, an electrical signal, an electromagnetic signal, a sonic signal, a microwave signal, an electro chemical signal, or any other signal suitable for the intended purpose. Detection methodologies for determining the fracture characteristics can include, for example, remote sensing techniques such as methods similar to airborne magnetometer surveys, magnetic anomaly surveys, earth-resistivity surveys, ground penetrating radar surveys, nuclear magnetic resonance imaging, and the like.

In an embodiment, electrically active proppant is injected (or otherwise introduced) into the fracture. The proppant in the fracture can be tracked or traced, thus allowing the characteristics of the fracture (i.e., height, width, depth, and/or trajectory) to be determined. For example, Cramer et al, U.S. application patent Ser. No. 12/621,789, demonstrates visualizing reservoir fractures using electrically active proppants to carry electrical signals throughout the fracture and detecting the electrical signals at the surface. As used herein a "proppant" is a composition of sized particles mixed with fracturing fluid to open and/or hold fractures open during and after a hydraulic fracturing treatment. The electrical signal is then transmitted into the fracture charging the electrically active proppant. The electrical signal is conducted along and reflected back from the electrically active proppant and detected by at least one receiver. The electrical signal can also comprise, for example, an electrical signal, an electromagnetic signal, a sonic signal, a microwave signal, or any other signal suitable for the intended purpose. The detected electrical signal is then sent to the seismic interface box, where the electrical signal is converted to a voltage signal compatible with the autonomous seismic recorder. In an alternate approach, a resistive proppant can be injected and an electrical current injected either at the surface or downhole that could be measured at the surface which would be modified by the resistive nature of the proppant and thus the fracture mapped and detected.

In determining electromagnetic data, for example, electromagnetic coils may be incorporated into the recorder itself. Alternatively, the electromagnetic coils may be attached to the seismic interface box. In determining magnetic data, for example, a magnetometer, such as a three component fluxgate magnetometer, may be attached to the seismic interface box. An accelerometer, such as a MEMS® accelerometer, may be attached to the seismic interface box for recording gravity measurements to map the impact of the fracture if for example the proppant injected was a heavy material like bismuth-tungsten composites.

In another embodiment a 4D or time varying experiment can be conducted. In another embodiment, the procedure above could be modified to allow a proppant with tuned geophysical properties to take advantage of the particular geologic situation being generated in order to maximize the resolution of the technique. For example in resistive shale, a highly conductive proppant could be injected and a coded electrical signal could be applied to form an antenna like transmitter in the shale that could be detected and modeled to determine fracture size and extent.

In a further embodiment, if the geophysical contrast of the proppant and the host rock is sufficiently high, then the field can be measured and mapped in real time during fracture and growth. For example, using a bismuth-tungsten proppant, which has a high density, with gravity based measurements of the resulting fracture would be detectable in real time as the fracture grew and propagated thus changing the gravity field over time.

In a further embodiment, the system could be operated during exploration for mineral or oil and gas deposits.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Ser. No. 12/621,789 filed Nov. 19, 2009, Cramer et al., "Controlled Source Fracture Monitoring."
2. U.S. patent application Ser. No. 13/297,456 filed Nov. 16, 2011, Eick et al., "Electrical Method Seismic Interface Box."
3. U.S. Pat. No. 6,330,914 Hockings et al., "Method and Apparatus for Tracking Hydraulic Fractures in Unconsolidated and Weakly Cemented Soils and Sediments."
4. WO2007013883 published Feb. 1, 2007, Hexion Specialty Chemicals, "Method of Estimating Fracture Geometry, Compositions and Articles Used for the Same."

The invention claimed is:

1. A system for evaluating and measuring geometry of a fracture, the system comprising:
   a grid of receivers arranged on a surface, wherein each receiver includes at least one geophysical receiver package connected to a seismic interface box, wherein the grid of receivers is time stamped and synchronized to a global position time to measure a baseline surface, and wherein the grid of receivers detects an electrical signal conducted along and reflected back from an electrically active proppant;
   an electromagnetic coil attached to the seismic interface box; and
   the seismic interface box connected to an autonomous seismic data node, wherein the seismic interface box coverts the electrical signal received from the at least one geophysical receiver package into a voltage signal compatible with the autonomous seismic data node, and a fracture geometry is determined by at least one of an inversion technique or a modelling technique of the voltage signal.

2. The system according to claim 1, wherein the at least one geophysical receiver package is selected from a group consisting of a geophone, a hydrophone, an accelerometer, an electrodynamic receiver, conductivity probe, resistivity probe, magnetometer, electromagnetics coil, electrical coil, and combinations thereof.

3. The system according to claim 1, wherein the fracture geometry is determined spatially and time-resolved.

4. The system according to claim 3, wherein the fracture geometry, after being determined spatially and time resolved, indicates real-time measure of fracture growth.

5. A system for evaluating and measuring geometry of a fracture, the system comprising:
   a 3D grid of receivers arranged on a surface, wherein each receiver includes at least one geophysical receiver package connected to a seismic interface box, wherein the grid of receivers is time stamped and synchronized to a global position time to measure a baseline survey and wherein the grid of receivers detects an electrical signal conducted along and reflected back from an electrically active proppant; and
   the seismic interface box connected to a semi-autonomous seismic data node, wherein the seismic interface box coverts the electrical signal reflected back from the electrically active proppant into a voltage signal compatible with the autonomous seismic data node, and wherein a fracture geometry is determined by at least one of an inversion technique or a modeling technique of the voltage signal.

6. The system according to claim 5, wherein the at least one geophysical receiver package is selected from a group consisting of a geophone, a hydrophone, an accelerometer, an electrodynamic receiver, conductivity probe, resistivity probe, magnetometer, electromagnetics coil, electrical coil, and combinations thereof.

7. The system according to claim 5, wherein the fracture geometry is determined spatially and time-resolved.

8. The system according to claim 7, wherein the fracture geometry, after being determined spatially and time resolved, indicates real-time measure of fracture growth.

9. A method for evaluating and measuring geometry of a fracture, the method comprising:
   setting up a grid of receivers on a surface;
   injecting an electrically active proppant into a fracture;
   transmitting an electrical signal into the fracture;
   detecting the electrical signal with a 3D grid of receivers, wherein each receiver includes at least one geophysical receiver package, wherein the grid of receivers is time stamped and synchronized to a global position time;
   converting the electrical signal from the geophysical receiver package into a voltage signal compatible with an autonomous data recorder;
   using the autonomous recorder to record the voltage signal and produce recorded data;
   evaluating and measuring a fracture geometry using the recorded data and at least one of an inversion technique or a modelling technique of the voltage signal.

10. The method according to claim 9, wherein the electrical signal charges the electrically active proppant.

11. The method according to claim 10, wherein the electrical signal charged electrically active proppant is detected by the at least one geophysical receiver package.

12. The method according to claim 9, wherein the fracture geometry is determined spatially and time-resolved.

13. The method according to claim 12, wherein the fracture geometry, after being determined spatially and time resolved, indicates real-time measure of fracture growth.

14. A method for evaluating and measuring geometry of a fracture comprising:
   setting up a 3D grid of receivers on a surface;
   injecting a proppant into a fracture;
   charging the proppant with an electrical signal;
   transmitting the electrical signal into the fracture;
   detecting the electrical signal with the 3D grid of receivers, wherein each receiver includes at least one geophysical receiver package wherein the grid of receivers is time stamped and synchronized to a global position time;
   converting the electrical signal from the at least one geophysical receiver package into a voltage signal compatible with an autonomous data recorder;
   using the autonomous recorder to record the voltage signal and produce recorded data; and
   evaluating and measuring a fracture geometry using the recorded data and at least one of an inversion technique or a modelling technique of the voltage signal.

15. The method according to claim 14, wherein the fracture geometry is determined spatially and time-resolved.

16. The method according to claim 15, wherein the fracture geometry, after being determined spatially and time resolved, indicates real-time measure of fracture growth.

\* \* \* \* \*